US012798689B2

(12) United States Patent
Lee et al.

(10) Patent No.: US 12,798,689 B2
(45) Date of Patent: Nov. 17, 2026

(54) VEHICLE COMPONENT FIXING DEVICE

(71) Applicants: Hyundai Motor Company, Seoul (KR); Kia Corporation, Seoul (KR)

(72) Inventors: Jae Seung Lee, Hwaseong-Si (KR); Won Ki Song, Seongnam-Si (KR); Jin Ho Hwang, Cheonan-Si (KR); Joong Hyun Shin, Hwaseong-Si (KR); Hyung Sik Choi, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 251 days.

(21) Appl. No.: 18/679,170

(22) Filed: May 30, 2024

(65) Prior Publication Data

US 2025/0222991 A1 Jul. 10, 2025

(30) Foreign Application Priority Data

Jan. 4, 2024 (KR) ........................ 10-2024-0001361

(51) Int. Cl.
*B62D 27/06* (2006.01)
*B62D 63/02* (2006.01)

(52) U.S. Cl.
CPC ........... *B62D 27/06* (2013.01); *B62D 63/025* (2013.01)

(58) Field of Classification Search
CPC ...... B62D 27/06; B62D 63/025; B62D 65/04; B62D 24/00; B62D 33/077
USPC ................................................ 296/35.1, 35.3
See application file for complete search history.

(56) References Cited

U.S. PATENT DOCUMENTS

| | | | | |
|---|---|---|---|---|
| 5,048,704 | A * | 9/1991 | Takahashi | H01F 7/0263 213/75 D |
| 10,029,603 | B2 * | 7/2018 | Stocks | B62D 63/025 |
| 10,150,524 | B2 * | 12/2018 | Evans | B60L 53/14 |
| 10,479,427 | B2 * | 11/2019 | Scaringe | B60K 1/04 |
| 10,545,509 | B1 * | 1/2020 | Jessen | B62D 31/003 |
| 10,899,240 | B2 * | 1/2021 | Evans | B64D 9/00 |
| 11,319,042 | B2 * | 5/2022 | Seeley | B63G 8/16 |
| 11,338,859 | B2 * | 5/2022 | Wires | B62D 63/025 |
| 11,420,688 | B2 * | 8/2022 | Yamashita | B60K 1/04 |
| 11,505,265 | B2 * | 11/2022 | Lee | B60L 50/66 |

(Continued)

FOREIGN PATENT DOCUMENTS

| | | | | |
|---|---|---|---|---|
| CN | 120886600 | A * | 11/2025 | B25J 19/00 |
| DE | 102020209088 | A1 * | 8/2021 | B62D 63/025 |

(Continued)

*Primary Examiner* — Jason S Morrow
(74) *Attorney, Agent, or Firm* — MORGAN, LEWIS & BOCKIUS LLP

(57) ABSTRACT

In a vehicle component fastening device, the vehicle component fastening device includes: a detachable unit assembled to a vehicle body to form an internal space in a vehicle; an assembly module which is provided on the vehicle body and to which the detachable unit is selectively coupled, wherein, inside the module, a circular magnetic body is rotatably mounted, and in response to the rotation of the circular magnetic body, the detachable unit is mechanically fastened to the vehicle body and a magnetic circuit is changed simultaneously therewith so that the detachable unit is magnetically fastened to the vehicle body; and a detachable module configured to rotate the circular magnetic body inside the assembly module by receiving power externally or from the vehicle.

18 Claims, 8 Drawing Sheets

(56) References Cited

U.S. PATENT DOCUMENTS

| | | | | |
|---|---|---|---|---|
| 11,505,283 | B1 * | 11/2022 | Seeley | B63B 3/08 |
| 12,005,979 | B2 * | 6/2024 | Moarefi | B62D 63/025 |
| 12,397,863 | B2 * | 8/2025 | Hwang | B62D 27/06 |
| 2011/0291444 | A1 * | 12/2011 | Ische | B60P 3/42<br>296/193.04 |
| 2020/0369334 | A1 * | 11/2020 | Lee | B60K 1/04 |
| 2021/0331749 | A1 * | 10/2021 | Hwang | B62D 24/00 |
| 2025/0019020 | A1 * | 1/2025 | Lee | B62D 33/077 |
| 2025/0115317 | A1 * | 4/2025 | Hwang | B62D 27/06 |

FOREIGN PATENT DOCUMENTS

| | | | | |
|---|---|---|---|---|
| JP | 2021165544 A | * | 10/2021 | B60K 1/04 |
| KR | 10-2018-0070787 | | 6/2018 | |

* cited by examiner

VEHICLE COMPONENT FIXING DEVICE

CROSS-REFERENCE TO RELATED APPLICATION(S)

The present application claims priority to Korean Patent Application No. 10-2024-0001361, filed on Jan. 4, 2024, the entire contents of which is incorporated herein for all purposes by this reference.

BACKGROUND OF THE PRESENT DISCLOSURE

Field of the Present Disclosure

The present disclosure relates to a vehicle component fixing device configured for mechanically and magnetically fastening a detachable unit, which forms the internal space of a vehicle, to a vehicle body.

Description of Related Art

Recently, with increased interest in the environment, the number of electric vehicles provided with an electric motor as a power source is increasing.

In the case of electric vehicles, a spacious internal space like a living room is being implemented through the advantage of a flat floor, which is a characteristic of the electric vehicle. For example, in the case of autonomous vehicles, purpose-based vehicles (PBV), and vehicles provided with three rows of seats, many bed and seat concepts for rest and sleep while moving are being provided.

Due to an increase in independent leisure culture, the demand for camping or traveling while sleeping in a vehicle is also increasing.

FIG. 1 is a view illustrating a cabin and a loading unit behind the cabin of a vehicle.

Referring to FIG. 1, an additional internal space is ensured by coupling a cabin 10 and a loading unit 20 of a vehicle to each other. In the instant case, it is very important in terms of passenger safety to firmly attach the cabin 10 and the loading unit 20 of the vehicle to each other.

Conventionally, to couple the cabin 10 and the loading unit 20 of the vehicle to each other, one of a mechanical fixation and magnetic fixation is generally used. However, in the case of mechanical fixation, additional labor is required to assemble or disassemble the cabin 10 and the loading unit 20, and there is a problem in that durability is reduced due to frequent assembly and disassembly.

Furthermore, in the case of the magnetic fixation, there is a problem in that the fixing force between the cabin 10 and the loading unit 20 is insufficient compared to the mechanical fixation.

Accordingly, there is a need for a method to increase the coupling force by mechanically and magnetically fixing the cabin 10 and the loading unit 20 of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle component fixing device configured for mechanically and magnetically coupling a detachable unit, which can removably attached to a vehicle body and is assembled to the vehicle body to form an internal space of the vehicle.

In view of the foregoing, a vehicle component fixing device according to an exemplary embodiment of the present disclosure includes: a detachable unit assembled to a vehicle body to form an internal space in a vehicle; an assembly module which is provided on the vehicle body and to which the detachable unit is selectively coupled, wherein, inside the module, a circular magnetic body is rotatably mounted, and in response to the rotation of the circular magnetic body, the detachable unit is mechanically fastened to the vehicle body and a magnetic circuit is changed simultaneously therewith so that the detachable unit is magnetically fastened to the vehicle body; and a detachable module configured to rotate the circular magnetic body inside the assembly module by receiving power externally or from the vehicle.

Inside the assembly module, a rocker configured to be rotated in conjunction with the rotation of the circular magnetic body may be provided, and the rocker may be inserted into the detachable unit to mechanically fasten the detachable unit to the vehicle body.

The circular magnetic body may include a first shaft which rotates at a center portion thereof and protrudes to an outside of the assembly module, the rocker may include a second shaft which rotates at a center portion thereof and protrudes to the outside of the assembly module, and the first shaft and the second shaft may be linked by a belt, and the second shaft may be rotated in response to the rotation of the first shaft.

A rod magnetic body may be provided inside the assembly module to be fixed at a position spaced from the circular magnetic body, and the magnetic circuit may be changed in response to the rotation of the circular magnetic body so that the detachable unit may be magnetically fastened to the vehicle body.

When the circular magnetic body and the rod magnetic body are disposed with the same polar orientation, the detachable unit may be fastened to the vehicle body by a magnetic force, and when the circular magnetic body and the rod magnetic body are disposed with different polar orientations, the detachable unit may be disassembled from the vehicle body.

The rod magnetic body may be provided at a position spaced upward or downward from the circular magnetic body with a predetermined distance.

The detachable module may include a coil and may be provided separately outside the vehicle, and current may be supplied to the coil to rotate the circular magnetic body inside the assembly module.

Inside or outside the assembly module, a drive motor may be provided to rotate the circular magnetic body, wherein the drive motor may be configured to receive power via the detachable module and to rotate the circular magnetic body inside the assembly module. A third shaft may be provided outside the assembly module to be connected to the drive motor, the circular magnetic body may include a first shaft which protrudes to the outside of the assembly module, and the drive motor and the first shaft may be connected to each other via the third shaft.

On the bottom surface of the detachable unit, a coupling groove may be recessed upward, a rocker configured to be rotated in conjunction with the rotation of the circular magnetic body may be provided inside the assembly module, and when the detachable unit is fastened to the vehicle body, the rocker is rotated in conjunction with the rotation of the circular magnetic body while the rocker slides in the coupling groove and accommodated at the upper end portion of the coupling groove, so that the detachable unit may be mechanically fastened to the vehicle body.

The rocker may include a semicircular shape with one side protruding.

The coupling groove may include a shape recessed along a path along which the rocker is slid, and the upper end portion of the coupling groove may be formed in a semi-circular shape so that the rocker is rotated and coupled to the detachable unit after being accommodated at the upper end portion of the coupling groove.

The detachable unit may be provided with the assembly module and may be fastened to the vehicle body via the assembly module.

The coupling groove is recessed downward on the top surface of the vehicle body, a rocker configured to be rotated in conjunction with the rotation of the circular magnetic body may be provided inside the assembly module, and when the detachable unit is fastened to the vehicle body, the rocker is rotated in conjunction with the rotation of the circular magnetic body while the rocker slides in the coupling groove and accommodated at the upper end portion of the coupling groove, so that the detachable unit may be mechanically fastened to the vehicle body.

The assembly module may include a pair of pole panels which forms side walls of the assembly module and serve as a movement path for magnetic fluxes of the circular magnetic body, and the circular magnetic body may be accommodated inside the pair of pole panels.

A rod magnetic body may be provided to be fixed inside the pair of pole panels, the rod magnetic body may be provided above the circular magnetic body, a rocker engaged to the circular magnetic body and configured to rotate in conjunction with the rotation of the circular magnetic body may be provided above the rod magnetic body, the rocker may be inserted into the detachable unit to mechanically fasten the detachable unit to the vehicle body, and the magnetic circuit may be changed in response to the rotation of the circular magnetic body so that the detachable unit may be magnetically fastened to the vehicle body.

With the vehicle component fixing device of the present disclosure, a detachable unit, which forms an internal space of a vehicle, may be mechanically and magnetically coupled. As a result, it is possible to provide a vehicle component fixing device that allows easy detachment and attachment of a component while providing an excellent component coupling force.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
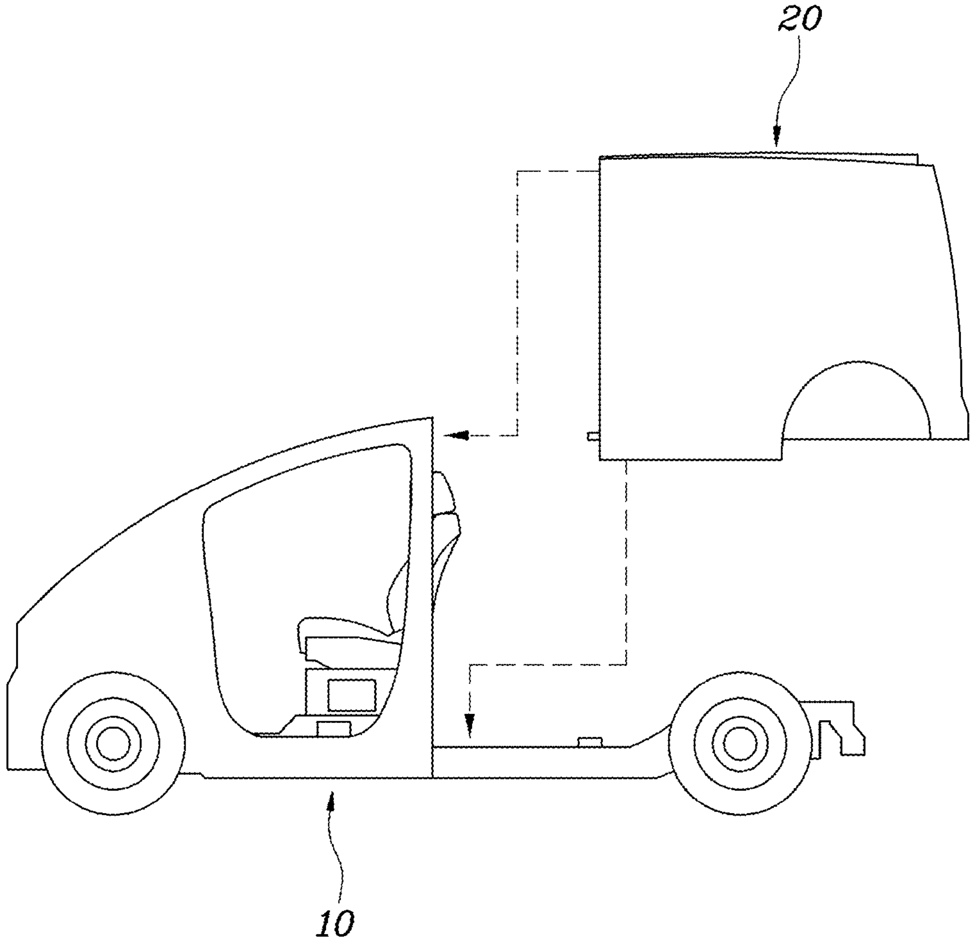
FIG. 1 is a view illustrating a cabin and a loading unit behind the cabin in a vehicle.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings, and the same or similar elements are provided the same and similar reference numerals, so duplicate descriptions thereof will be omitted.

In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit included herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

A singular expression may include a plural expression unless they are definitely different in a context.

As used herein, the expression "comprise", "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

The terms “module” and “unit” used for the elements in the following description are provided or interchangeably used in consideration of only the ease of writing the specification, and do not have distinct meanings or roles by themselves.

In the case where an element is referred to as being “connected” or “coupled” to any other element, it should be understood that another element may be provided therebetween, as well as that the element may be directly connected or coupled to the other element. In contrast, in the case where an element is “directly connected” or “directly coupled” to any other element, it should be understood that no other element is present therebetween.

Figure 2:
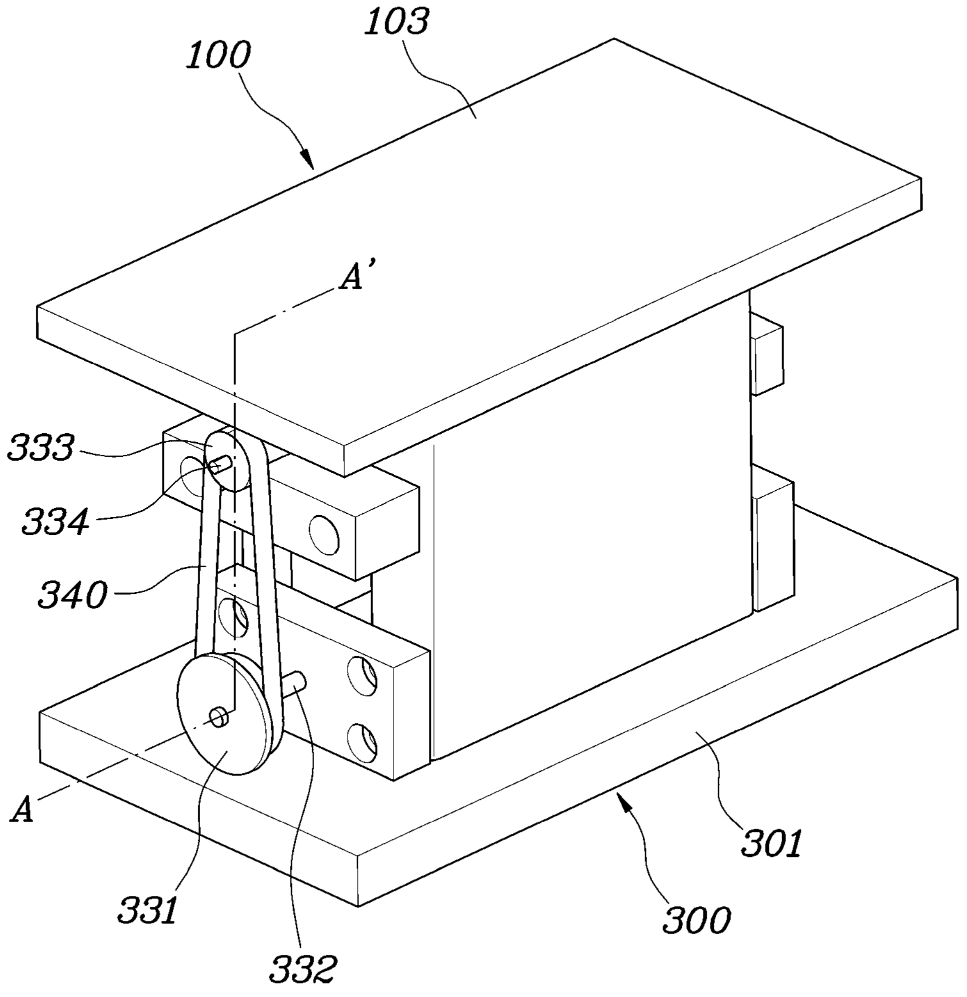
FIG. 2 is a view exemplarily illustrating a vehicle component fixing device according to an exemplary embodiment of the present disclosure.
Figure 3:
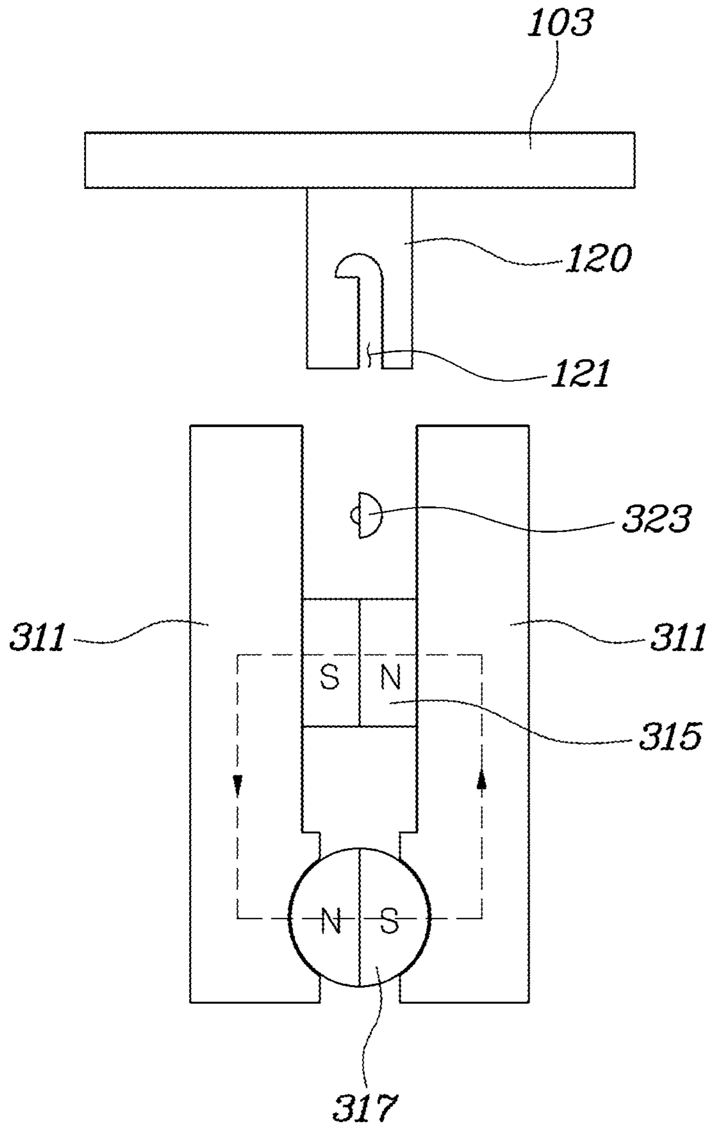
FIG. 3 is a view exemplarily illustrating a cross-section taken along line A-A' in FIG. 2.
Figure 4:
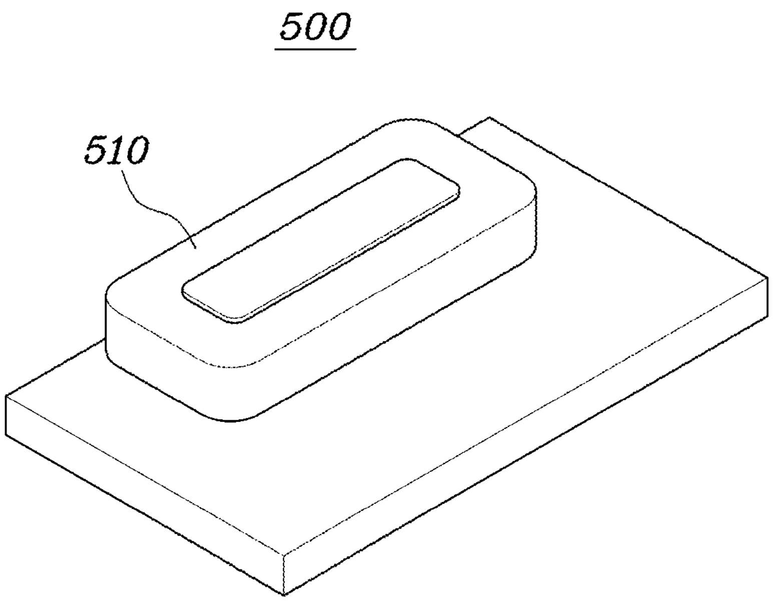
FIG. 4 is a view exemplarily illustrating an exemplary embodiment of a detachment/attachment module of a vehicle component fixing device.

FIG. 2 is a view exemplarily illustrating a vehicle component fixing device according to an exemplary embodiment of the present disclosure, FIG. 3 is a view exemplarily illustrating a cross-section taken along line A-A' in FIG. 2, and FIG. 4 is a view exemplarily illustrating an exemplary embodiment of a detachment/attachment module of a vehicle component fixing device.

Referring to FIG. 2 and FIG. 3, a vehicle component fixing device according to an exemplary embodiment of the present disclosure includes: a detachable unit 100 assembled to a vehicle body to form an internal space; and an assembly module 300 which is provided in the vehicle body and to which the detachable unit is coupled. A circular magnetic body 317 is rotatably provided inside the assembly module 300, and when the circular magnetic body 317 is rotated, the detachable unit 100 is mechanically fastened to the vehicle body, and a magnetic circuit is changed simultaneously therewith so that the detachable unit 100 is magnetically fastened to the vehicle body.

The detachable unit 100 may be assembled to the vehicle body to provide an additional internal space. For example, the detachable unit 100 may be provided with a seat for passengers to board, or may be provided with a space for loading luggage. The detachable unit 100 may include a bottom floor 103 that forms the bottom portion of the internal space, and the bottom floor 103 may be provided with components for assembling the detachable unit 100 to the vehicle body.

The detachable unit 100 may be assembled to the vehicle body via the assembly module 300, which will be described below.

The assembly module 300 may be provided in the vehicle body. The assembly module 300 may be provided on the vehicle body bottom floor 301 that forms the vehicle body. The rotatable circular magnetic body 317 is provided inside the assembly module 300. When the circular magnetic body 317 rotates, the detachable unit 100 may be mechanically fastened to the vehicle body, and a magnetic circuit, i.e., the path of magnetic fluxes, is changed simultaneously therewith in response to the rotation of the circular magnetic body 317 so that the detachable unit 100 may be magnetically fastened to the vehicle body.

Meanwhile, a detachable module 500 configured to rotate the circular magnetic body 317 may be provided. The detachable module 500 may be provided outside or inside the vehicle. The detachable module 500 may rotate the circular magnetic body 317 inside the assembly module 300 by receiving power from the outside of the vehicle or from the vehicle.

Referring to FIG. 4, in an exemplary embodiment of the present disclosure, the detachable module 500 may include a coil 510. Furthermore, the detachable module is separately provided outside the vehicle. When current is supplied to the coil 510, the coil 510 functions as an electromagnet, and the circular magnetic body 317 located adjacent to the coil 510 is rotated by an electromagnetic force.

Figure 6:
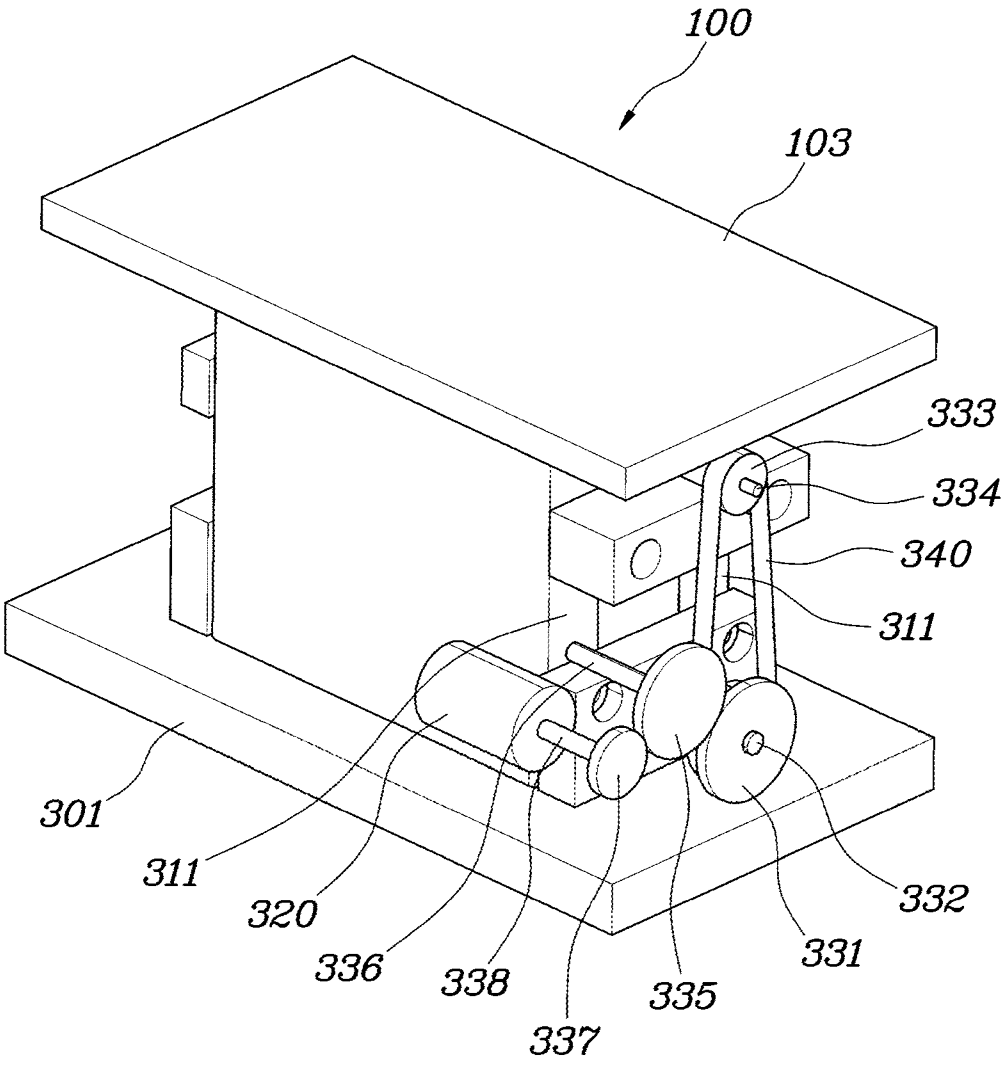
FIG. 6 is a view exemplarily illustrating a vehicle component fixing device according to another exemplary embodiment of the present disclosure.

Referring to FIG. 6, in another exemplary embodiment of the present disclosure, the detachable module may be a device configured to supply power to a drive motor 320. When the power is supplied to the drive motor 320, the drive motor 320 is driven, and the circular magnetic body 317 is rotated.

A detailed description of various exemplary embodiments will be provided later.

Hereinafter, the mechanical fastening and magnetic fastening of the detachable unit 100 by the rotation of the circular magnetic body 317 will be described. Various exemplary embodiments to be described later differs from the above-described embodiment only in the method of rotating the circular magnetic body 317, but is the same as the above-described embodiment in that the mechanical fastening and magnetic fastening are simultaneously executed by the rotation of the circular magnetic body 317.

Figure 7:
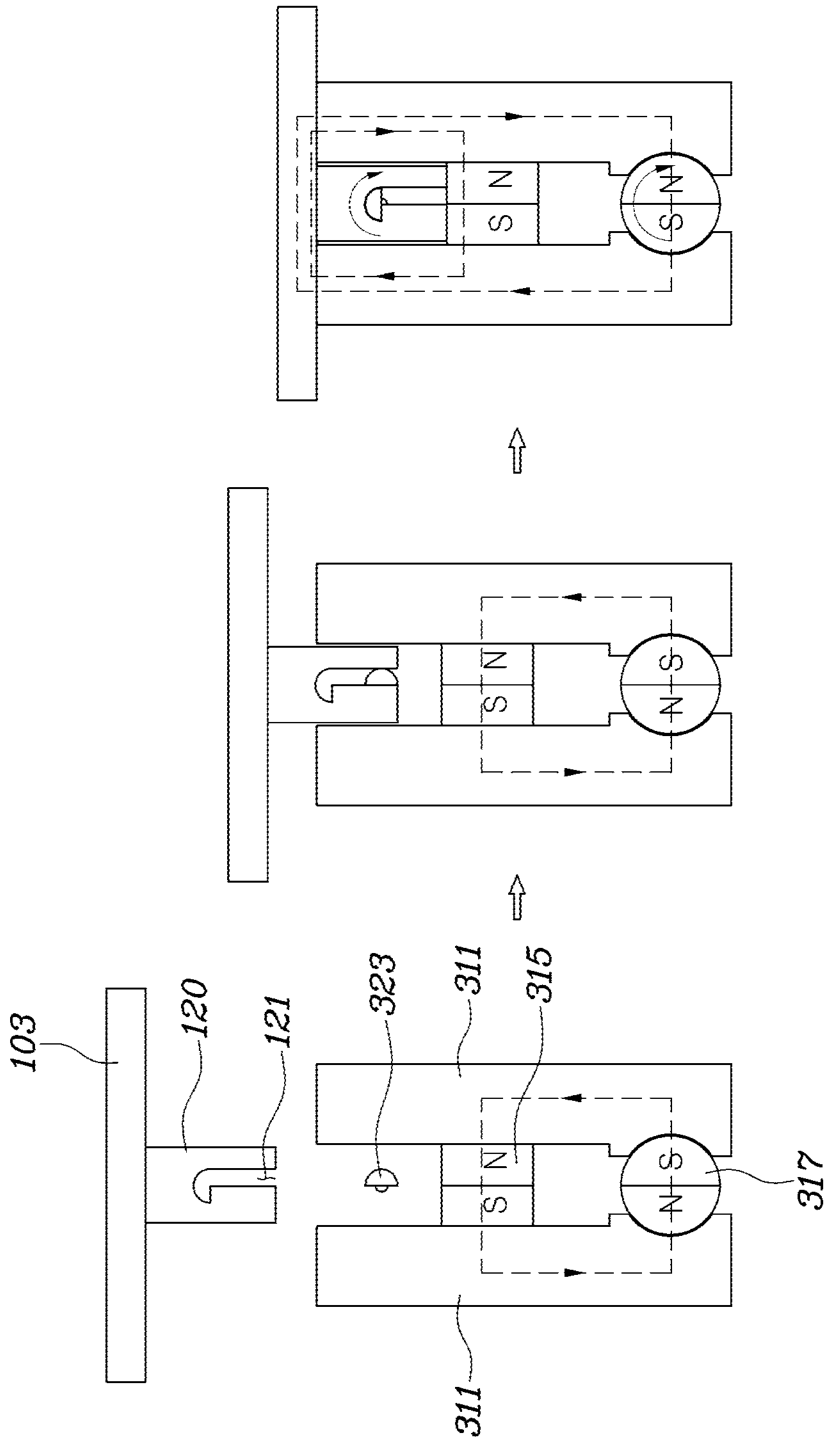
FIG. 7 and FIG. 8 are views exemplarily illustrating the coupling and separation of the assembly module and the detachable unit, respectively.

Referring to FIG. 2 and FIG. 3 and FIG. 7, a rocker 323 configured to rotate in conjunction with the rotation of the circular magnetic body 317 is provided inside the assembly module 300. The rocker 323 is inserted into the detachable unit 100 to mechanically fasten the detachable unit 100 to the vehicle body. The circular magnetic body 317 and the rocker 323 may be linked in rotation so that when the circular magnetic body 317 is rotated, the rocker 323 can also be rotated in the same direction thereof.

To link the circular magnetic body 317 and the rocker 323 in rotation, the circular magnetic body 317 is provided with a first shaft 332 that protrudes to the outside of the assembly module 300, the rocker 323 is provided with a second shaft 334 that protrudes to the outside of the assembly module, and the first shaft 332 and the second shaft 334 may be linked with each other via a belt 340.

That is, when the circular magnetic body 317 is rotated by the detachable module 500, the first shaft 332 may be rotated in response to the rotation of the circular magnetic body 317, and as the second shaft 334 connected to the first shaft 332 is rotated, the rocker 323 may be rotated as well.

In the instant case, a first pulley 331 is coupled to the first shaft 332, a second pulley 333 is coupled to the second shaft 334, and a belt 340 is coupled to the external perimeters of the first pulley 331 and the second pulley 333 so that the first shaft 332 and the second shaft 334 may be linked in rotation.

Furthermore, a coupling groove 121 recessed upward may be provided on the bottom surface of the detachable unit 100. A coupling flange 120 is provided on the bottom surface of the bottom floor 103 of the detachable unit 100, and the coupling groove 121 may be recessed upward into the coupling flange 120.

Accordingly, the detachable unit 100 may be moved so that the rocker 323 may be slid into the coupling groove 121. When the detachable unit 100 and the assembly module 300 are matched, the circular magnetic body 317 may be rotated, and in response to the rotation of the circular magnetic body 317, the rocker 323 may be rotated within the coupling groove 121 so that the detachable unit 100 may be mechanically fastened to the vehicle body.

Meanwhile, the rocker 323 includes a semicircular shape with one side protruding, and the coupling groove 121 includes a shape recessed along the path along which the rocker 323 is slid, and the upper end portion of the coupling groove 121 is formed in a semicircular shape so that, after being accommodated therein, the rocker 323 may be rotated and coupled to the detachable unit 100, enabling the detachable unit to be fastened to the vehicle body.

Referring to FIG. 2 and FIG. 3 and FIG. 7, a rod magnetic body 315 is provided inside the assembly module 300 to be fixed at a position spaced from the circular magnetic body 317. The rod magnetic body 315 may be provided at a position spaced upward or downward from the circular magnetic body with a predetermined distance 317 and is provided so that polarities of rod magnetic body 315 are fixed in a predetermined direction inside the assembly module 300. Therefore, when the polar orientation of the circular magnetic body 317 is changed in response to the rotation of the circular magnetic body 317, the magnetic circuit provided by the rod magnetic body 315 and the circular magnetic body 317, that is, the path for magnetic fluxes, is changed, so that the detachment unit 100 may be magnetically fastened to or disassembled from the vehicle body.

The assembly module 300 may include a pair of pole panels 311 that form side walls of the assembly module 300 and serve as a movement path for the magnetic fluxes of the circular magnetic body 317, and the circular magnetic body 317 may be accommodated inside the pair of pole panels 311.

Furthermore, the rod magnetic body 315 may be provided to be fixed inside the pair of pole panels 311 and on the upper side of the circular magnetic body 317, and the rocker 323, which rotates in conjunction with the rotation of the circular magnetic body 317, may be provided on the upper side of the rod magnetic body 315.

Referring to FIG. 7, before the detachable unit 100 is coupled to the assembly module 300, the circular magnetic body 317 and the rod magnetic body 315 are disposed with different polar orientations. The path of magnetic fluxes appears as illustrated in the drawing due to the nature of magnetic fluxes coming out from the N pole and moving to the S pole.

However, when the circular magnetic body 317 is rotated and disposed with the same polar orientation as the rod magnetic body 315, the magnetic fluxes come out from the N pole and move to the S pole due to the same property. However, at the instant time, since the magnetic fluxes inevitably flow to the metal detachable unit and move through the detachable unit 100 made of a metal material, a magnetic force acts on the detachable unit 100 so that the detachable unit 100 is magnetically fastened to the assembly module 300.

Furthermore, the rocker 323 is rotated in response to the rotation of the circular magnetic body 317 so that the detachable unit 100 and the assembly module 300 are firmly secured by the rocket 323 locked to the coupling groove 121.

In summary, referring to FIG. 7, when the circular magnetic body 317 and the rod magnetic body 315 are disposed with the same polar orientation, it may be seen that the detachable unit 100 is fastened to the vehicle body by a magnetic force. Furthermore, referring to FIG. 8, when the circular magnetic body 317 and the rod magnetic body 315 are disposed with different polar orientations, it may be seen that the detachable portion 100 is disassembled from the vehicle body.

Figure 8:
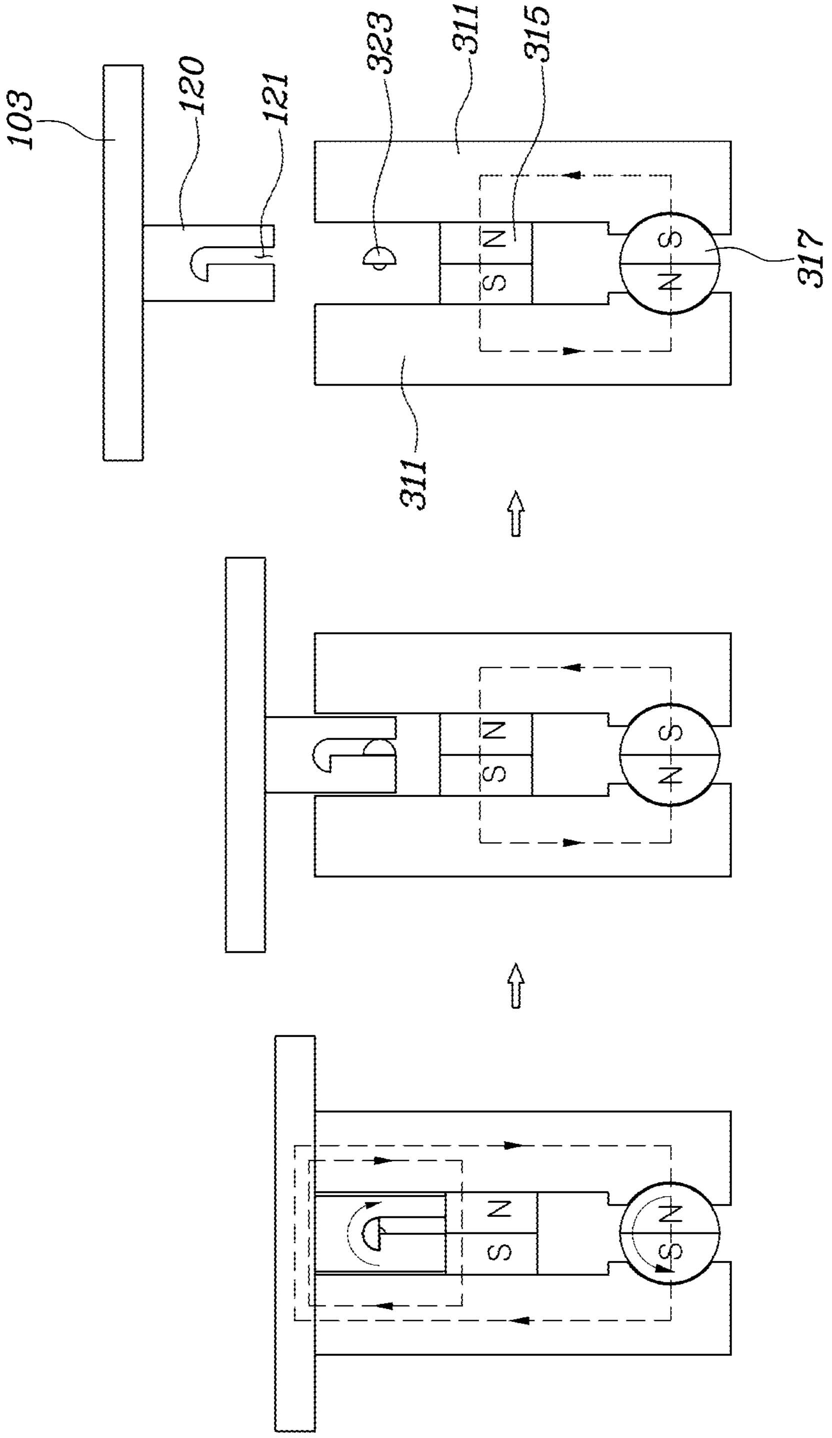

That is, as illustrated in FIG. 8, when the circular magnetic body 317 is rotated and disposed with a polar orientation different from that of the rod magnetic body 315, the path for magnetic fluxes is changed and the magnetic force no longer acts on the detachable unit 100. Furthermore, the rocker 323 is rotated in response to the rotation of the circular magnetic body 317 and the mechanical fastening is also released so that the detachable unit 100 may be easily disassembled from the assembly module 300.

Figure 5:
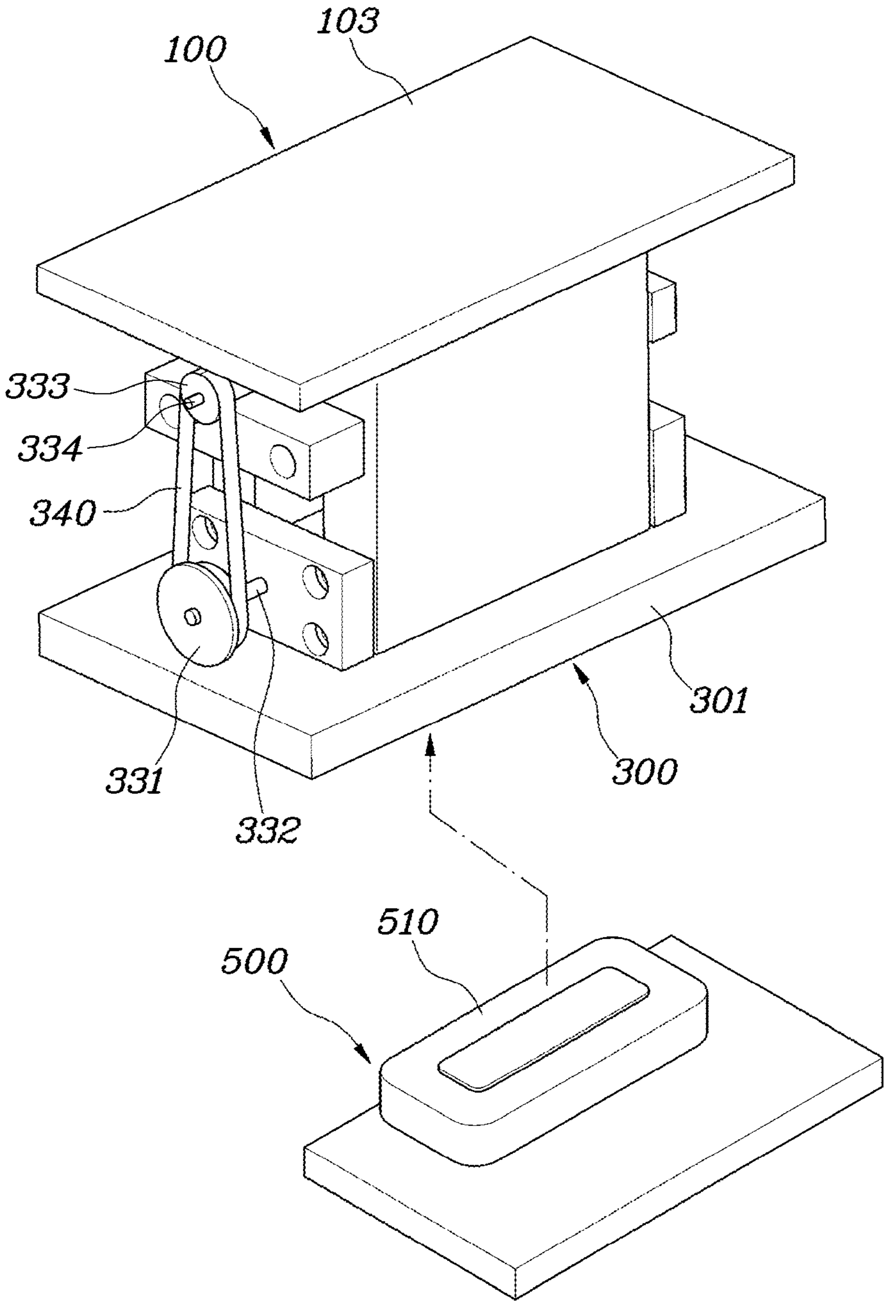
FIG. 5 is a view exemplarily illustrating that a detachable unit may be coupled/released when a detachable module approaches.

An exemplary embodiment in which the detachable module 500 includes a coil 510 will be described. Referring to FIG. 5, the detachable module 500 moves to the underneath of the assembly module 300 and is located close to the circular magnetic body 317, and when current is applied to the coil 510, the coil 510 applies an electromagnetic force to the circular magnetic body 317 so that the circular magnetic body 317 may be rotated.

When the circular magnetic body 317 is rotated, the detachable unit 100 may be mechanically and magnetically coupled via the rocker 323 as described above.

When the circular magnetic body 317 is rotated again, the rocker 323 is rotated and the mechanical fastening is released, and the magnetic circuit is changed simultaneously therewith so that the magnetic fluxes do not move to the detachment unit 100. Therefore, the magnetic fastening is released and the detachable unit 100 may be easily disassembled from the assembly module 300.

In an exemplary embodiment of the present disclosure, so as to rotate the circular magnetic body 317 again, the direction to which current is applied to the coil 510 is reversed, such that the coil 510 applies an electromagnetic force to the circular magnetic body 317 in the opposite direction so that the circular magnetic body 317 may be rotated in the opposite direction.

In another exemplary embodiment of the present disclosure, an exemplary embodiment in which the detachable module is a device configured to supply power to the drive motor 320 will be described. Referring to FIG. 6, a drive motor 320 may be provided on the external side of the assembly module 300 to rotate the circular magnetic body 317, and the drive motor 320 may receive power via the detachable module to rotate the circular magnetic body 317 inside the assembly module 300.

Although not illustrated, the detachable module is configured as a power supply source that can rotate the drive motor 320.

The reference numerals 331 and 333 denoted as first pulley and second pulley in the FIG. 2 will be denoted as first gear and second gear respectively in FIG. 6, Meanwhile, a third shaft 336 is provided outside the assembly module 300, and a third gear 335 may be coupled to the third shaft 336. The third gear 335 is engaged to the first gear 331 on one side and to the drive motor 320 on the other side to transmit the driving force of the drive motor 320 to the first gear 331 through the third gear 335 so that the circular magnetic body 317 may be rotated.

The drive motor 320 is provided with a fourth shaft 338, and a fourth gear 337 is connected to the fourth shaft 338 so that the fourth gear 337 may be engaged to the third gear 335.

The drive motor 320 may also be provided inside the assembly module 300. When the drive motor 320 is provided inside the assembly module 300, the circular magnetic body 317 may be connected to a rotation shaft of the drive motor 320 in the form illustrated in FIG. 2. The circular magnetic body 317 may be rotated by connecting the first shaft 332 included in the circular magnetic body 317 to the rotation shaft of the drive motor.

Meanwhile, in the above-described example, the assembly module 300 is provided in the vehicle body, and the detachable unit 100 is assembled to the assembly module, but on the other hand, an exemplary embodiment in which the assembly module is provided in the detachable unit is also possible.

That is, the design of the above-mentioned detachable unit may be changed to be provided on the vehicle, and the coupling groove may be recessed downward in a top surface of the vehicle body.

The rocker engaged to the circular magnetic body and configured to be rotated in conjunction with the rotation of the circular magnetic body is provided inside the assembly module provided in the detachable unit. When the detachable unit is fastened to the vehicle body, the rocker is rotated in conjunction with the rotation of the circular magnetic body while the rocker slides in the coupling groove and accommodated at the upper end portion of the coupling groove, so that the detachable unit may be mechanically and magnetically fastened to the vehicle body.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle component fixing apparatus comprising:

a detachable compartment assembled to a vehicle body to form an internal space in a vehicle;

an assembly module which is provided on the vehicle body and to which the detachable compartment is selectively coupled, wherein, inside the assembly module, a circular magnetic body is rotatably mounted, and in response to rotation of the circular magnetic body, the detachable compartment is mechanically fastened to the vehicle body and a magnetic circuit is changed simultaneously therewith so that the detachable compartment is magnetically fastened to the vehicle body; and a detachable driver configured to rotate the circular magnetic body inside the assembly module by receiving power externally or from the vehicle.

2. The vehicle component fixing apparatus of claim 1, wherein, inside the assembly module, a rocker engaged to the circular magnetic body and configured to be rotated in conjunction with the rotation of the circular magnetic body is provided, and the rocker is inserted into the detachable compartment in response to the rotation of the circular magnetic body, to mechanically fasten the detachable compartment to the vehicle body.

3. The vehicle component fixing apparatus of claim 2, wherein the circular magnetic body includes a first shaft which rotates at a center portion thereof and protrudes to an outside of the assembly module, wherein the rocker includes a second shaft which rotates at a center portion thereof and protrudes to the outside of the assembly module, and wherein the first shaft and the second shaft are linked by a belt, and the second shaft is rotated in response to rotation of the first shaft.

4. The vehicle component fixing apparatus of claim 1, wherein, inside the assembly module, a rod magnetic body is mounted to be fixed at a position spaced from the circular magnetic body, and the magnetic circuit is changed in response to the rotation of the circular magnetic body so that the detachable compartment is selectively magnetically-fastened to the vehicle body in response to the rotation of the circular magnetic body.

5. The vehicle component fixing apparatus of claim 4, wherein, in response that the circular magnetic body and the rod magnetic body are disposed with a same polar orientation, the detachable compartment is fastened to the vehicle body by a magnetic force, and in response that the circular magnetic body and the rod magnetic body are disposed with different polar orientations, the detachable compartment is disassembled from the vehicle body.

6. The vehicle component fixing apparatus of claim 4, wherein the rod magnetic body is provided at a position spaced upward or downward from the circular magnetic body with a predetermined distance.

7. The vehicle component fixing apparatus of claim 1, wherein the detachable driver includes a coil and is provided separately outside the vehicle, and the circular magnetic body is rotated inside the assembly module in response that current is supplied to the coil.

8. The vehicle component fixing apparatus of claim 1, wherein, inside or outside the assembly module, a drive motor engaged to the circular magnetic body is provided to rotate the circular magnetic body, and the drive motor receives power via the detachable driver and rotates the circular magnetic body inside the assembly module.

9. The vehicle component fixing apparatus of claim 8, wherein, outside the assembly module, a third shaft is provided to be connected to the drive motor, the circular magnetic body includes a first shaft which protrudes to the outside of the assembly module, and the drive motor and the first shaft are engaged to each other via the third shaft.

10. The vehicle component fixing apparatus of claim 1, wherein, on a bottom surface of the detachable compartment, a coupling groove is recessed upward, a rocker engaged to the circular magnetic body and configured to be rotated in conjunction with the rotation of the circular magnetic body is provided inside the assembly module, and in a state that the detachable compartment is fastened to the vehicle body, the rocker is rotated in conjunction with the rotation of the circular magnetic body while the rocker slides in the coupling groove and accommodated at an upper end portion of the coupling groove, so that the detachable compartment is mechanically fastened to the vehicle body.

11. The vehicle component fixing apparatus of claim 10, wherein the rocker includes a semicircular shape with one side protruding.

12. The vehicle component fixing apparatus of claim 11, wherein the coupling groove includes a shape recessed along a path along which the rocker is slid, and an upper end portion of the coupling groove is formed in a semicircular shape so that the rocker is rotated and coupled to the detachable compartment after being accommodated at the upper end portion of the coupling groove.

13. The vehicle component fixing apparatus of claim 10, wherein the detachable compartment includes a coupling flange and the coupling groove is recessed upward into the coupling flange.

14. The vehicle component fixing apparatus of claim 1, wherein the detachable compartment is provided with the assembly module and is fastened to the vehicle body via the assembly module.

15. The vehicle component fixing apparatus of claim 14, wherein a coupling groove is recessed downward on a top surface of the vehicle body, a rocker engaged to the circular magnetic body and configured to be rotated in conjunction with the rotation of the circular magnetic body is provided inside the assembly module, and in a state that the detachable compartment is fastened to the vehicle body, the rocker is rotated in conjunction with the rotation of the circular magnetic body while the rocker slides in the coupling groove and accommodated at an upper end portion of the coupling groove, so that the detachable compartment is mechanically fastened to the vehicle body.

16. The vehicle component fixing apparatus of claim 1, wherein the assembly module includes a pair of pole panels which forms side walls of the assembly module and serve as a movement path for magnetic fluxes of the circular magnetic body, and the circular magnetic body is accommodated inside the pair of pole panels.

17. The apparatus of claim 15, wherein, inside the pair of pole panels, a rod magnetic body is provided to be fixed, the rod magnetic body is provided above the circular magnetic body, a rocker engaged to the circular magnetic body and configured to rotate in conjunction with the rotation of the circular magnetic body is provided above the rod magnetic body, and the rocker is inserted into the detachable compartment to mechanically fasten the detachable compartment to the vehicle body, and due to the rotation of the circular magnetic body, the magnetic circuit is changed to magnetically fasten the detachable compartment to the vehicle body.

18. The vehicle component fixing apparatus of claim 17, wherein the detachable compartment includes a coupling flange and the coupling groove is recessed upward into the coupling flange, and wherein the coupling flange is selectively positioned between the pole panels.

* * * * *